(12) United States Patent
Chakraborty et al.

(10) Patent No.: US 11,048,777 B2
(45) Date of Patent: Jun. 29, 2021

(54) SYNTHESIS OF SECURITY EXPLOITS VIA SELF-AMPLIFYING DEEP LEARNING

(71) Applicant: International Business Machines Corporation, Armonk, NY (US)

(72) Inventors: Supriyo Chakraborty, White Plains, NY (US); Omer Tripp, Bronx, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/658,839

(22) Filed: Oct. 21, 2019

(65) Prior Publication Data

US 2020/0057839 A1    Feb. 20, 2020

Related U.S. Application Data

(63) Continuation of application No. 15/242,021, filed on Aug. 19, 2016, now Pat. No. 10,489,557.

(51) Int. Cl.
| | |
|---|---|
| G06F 15/18 | (2006.01) |
| G06F 21/00 | (2013.01) |
| G06F 21/57 | (2013.01) |
| G06N 3/04 | (2006.01) |

(52) U.S. Cl.
CPC ............ G06F 21/00 (2013.01); G06F 21/577 (2013.01); G06N 3/0445 (2013.01)

(58) Field of Classification Search
CPC ...... G06F 21/00; G06F 21/577; G06N 3/0445
See application file for complete search history.

(56) References Cited

U.S. PATENT DOCUMENTS

| | | | |
|---|---|---|---|
| 8,417,993 | B2 | 4/2013 | O'Leary |
| 8,429,614 | B2 | 4/2013 | Zhang et al. |
| 8,839,441 | B2 | 9/2014 | Saxena et al. |
| 9,213,613 | B2 | 12/2015 | Trisjono et al. |
| 2015/0106943 | A1 | 4/2015 | Tripp et al. |
| 2016/0042296 | A1 | 2/2016 | Shan et al. |

FOREIGN PATENT DOCUMENTS

| | | |
|---|---|---|
| CN | 101901183 A | 12/2010 |
| CN | 104573524 A | 4/2015 |

OTHER PUBLICATIONS

Non-Final Office Action received for U.S. Appl. No. 15/242,021 dated Mar. 26, 2019, 49 pages.
Bagheri et al., "Automated Dynamic Enforcement of Synthesized Security Policies in Android", Technical Report, Department of Computer Science, George Mason University, 2015, 15 pages.

*Primary Examiner* — Robert G Bachner
(74) *Attorney, Agent, or Firm* — Amin, Turocy & Watson, LLP

(57) ABSTRACT

Techniques for synthesizing security exploits via self-amplifying deep learning are provided. In one example, a computer-implemented method can comprise generating, by a system operatively coupled to a processor, a probabilistic model based on an evaluation of one or more first payloads included in a first group of payloads. The computer implemented method can also comprise determining, by the system, based on the probabilistic model, that at least one first payload from the first group of payloads is invalid. Additionally, the computer implemented method can comprise, generating, by the system, a second group of payloads based on removing the at least one invalid first payload from the first group of payloads.

20 Claims, 13 Drawing Sheets

SYNTHESIS OF SECURITY EXPLOITS VIA SELF-AMPLIFYING DEEP LEARNING

BACKGROUND

The subject disclosure relates to synthesizing security exploits via self-amplifying deep learning.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synthesizing security exploits via self-amplifying deep learning are described.

According to an embodiment, a computer-implemented method can comprise generating, by a system operatively coupled to a processor, a probabilistic model based on an evaluation of one or more first payloads included in a first group of payloads. The computer implemented method can also comprise determining, by the system, based on the probabilistic model, that at least one first payload from the first group of payloads is invalid. Further, the computer implemented method can also comprise generating, by the system, a second group of payloads based on removing at least one invalid first payload from the first group of payloads.

According to another embodiment, a computer program product for synthesizing security exploits via self-amplifying deep learning, is provided. The computer program product can comprise a computer readable storage medium having program instructions embodied therewith, wherein the program instructions are executable by a processing component to cause the processing component to determine that a payload generates a valid result. The program instructions when executed by the processing component further cause the processing component to atomize the payload into one or more atomic elements. Further, the programming instructions when executed by the processing component also cause the processing component to map the one or more atomic elements to one or more identifiers. Additionally, the programming instructions when executed by the processing component also cause the processing component to supply the one or more identifiers to a deep learning engine.

According to a further embodiment, a device is provided. The device comprises a validation component of a payload generator that determines that a payload is syntactically correct and generates a valid result. The device also comprises a mapping component of the payload generator that atomizes the payload into a plurality of constituent atomic elements, maps the plurality of constituent atomic elements to a plurality of unique identifiers, and supplies the plurality of unique identifiers to a deep learning engine as a vector of unique identifiers.

DETAILED DESCRIPTION

Figure 1:
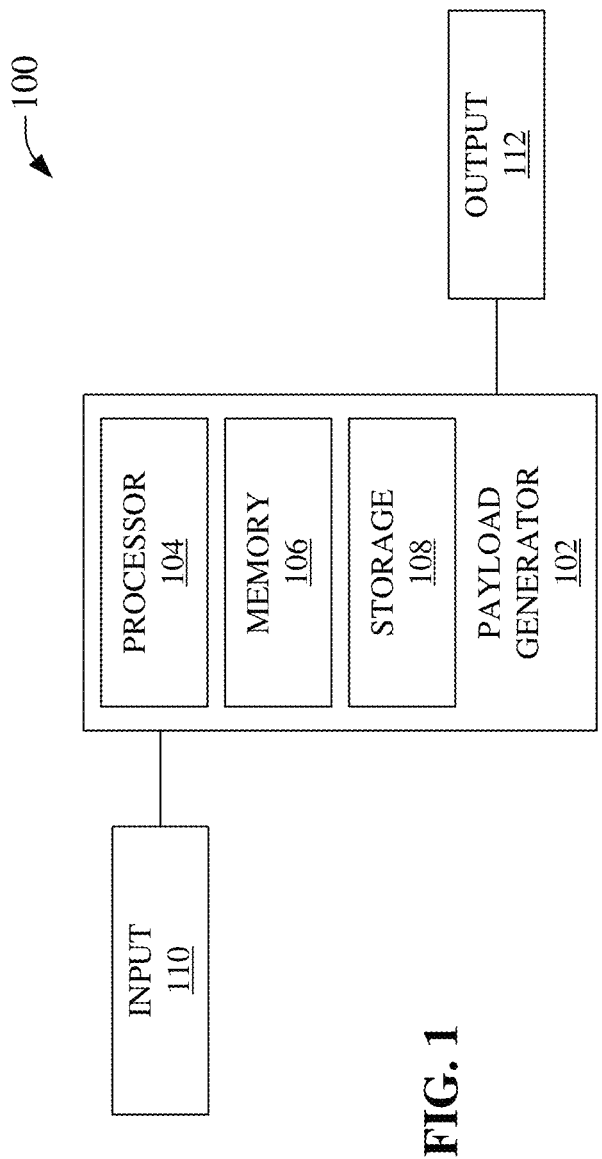
FIG. 1 illustrates a block diagram of an example, non-limiting system that facilitates synthesizing security exploits via self-amplifying deep learning in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The subject disclosure is directed to computer processing systems, computer-implemented methods, apparatus and/or computer program products that facilitate efficiently and automatically (e.g., without direct human involvement) synthesizing security exploits (e.g., payloads) via self-amplifying deep learning. Humans are unable to perform the embodiments described here as they include, and are not limited to, atomizing a payload into a first plurality of constituent atomic elements based on a language grammar, associating the first plurality of constituent atomic elements with a first plurality of unique identifiers, supplying the first plurality of unique identifiers as a vector to a multilayer recurrent neural network, receiving from the multilayer recurrent neural network a second plurality of unique identifiers, associating the second plurality of unique identifiers to a second plurality of constituent atomic elements, and/or reconstituting the second plurality of constituent atomic elements into a synthesized payload. In particular, synthesizing security exploits via self-amplifying deep learning can entail atomizing countless thousands of payloads into pluralities of constituent atomic elements based on a language grammar, associating the pluralities of constituent atomic elements with pluralities of unique identifiers, supplying the pluralities of unique identifiers sequences of vectors to a multilayer recurrent neural network, receiving from the multilayer recurrent neural network pluralities of unique identifiers processed by the multilayer recurrent neural network, associating the pluralities of unique identifiers processed by the multilayer recurrent neural network with further pluralities of constituent atomic elements, and/or reconstituting the further pluralities of constituent atomic elements into thousands upon thousands of synthesized payloads.

One or more aspects of the subject disclosure is directed to computer processing systems, computer-implemented methods, apparatus and/or computer program products that facilitate efficiently, effectively, and automatically (e.g., without direct human involvement) generating, by a system operatively coupled to a processor, a probabilistic model based on an evaluation of one or more first payloads included in a first group of payloads, determining, by the system, based on the probabilistic model, that at least one first payload from the first group of payloads is invalid, and generating, by the system, a second group of payloads based on removing the at least one invalid first payload from the first group of payloads. The computer processing systems, computer-implemented methods, apparatus and/or computer program products employ hardware and/or software to solve problems that are highly technical in nature. For example, problems are related to automated synthesis of security exploits via self-amplifying deep learning. These problems are not abstract and cannot be performed as a set of mental acts by a human. For example, a human, or even thousands of humans, cannot efficiently, accurately and effectively manually atomize a payload into a first plurality of constituent atomic elements based on a language grammar, associate the first plurality of constituent atomic elements with a first plurality of unique identifiers, supply the first plurality of unique identifiers as a vector to a multilayer recurrent neural network, receive from the multilayer recurrent neural network a second plurality of unique identifiers, associate the second plurality of unique identifiers to a second plurality of constituent atomic elements, and/or reconstitute the second plurality of constituent atomic elements into a synthesized payload.

FIG. 1 illustrates a block diagram of an example, non-limiting system 100 that facilitates synthesizing security exploits via self-amplifying deep learning in accordance with one or more embodiments described herein. Aspects of systems (e.g., non-limiting system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, non-limiting system 100 can be any type of component, machine, device, facility, apparatus, and/or instrument that includes a processor and/or is capable of effective and/or operative communication with a wired and/or wireless network. Components, machines, apparatuses, devices, facilities, and/or instrumentalities that can comprise non-limiting system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, non-limiting system 100 can include payload generator 102, processor 104, memory 106 and/or storage 108. In some embodiments, one or more of the payload generator 102, processor 104, memory 106 and/or storage 108 can be communicatively and/or electrically coupled to one another to perform one or more functions of system 100. In some embodiments, payload generator 102 can receive as input 110 an initial plurality of payloads (or exploits), wherein each payload (or, in some embodiments, one or more payloads) included in the initial plurality of payloads can be or include program instructions written in a high-level, dynamic, un-typed, and interpreted programming language, such as JavaScript. A high-level programming language can be a programming language that abstracts the complexity of the underlying computer from the programmer A programming language can be considered to be dynamic when programming operations are performed at runtime. An un-typed programming language is one that allows any operation to be performed on any data, which are generally considered to be sequences of bits of various lengths. An interpreted programming language can be a programming language programming instructions are executed directly, without the need to compile the program into machine-language instructions.

An example payload written in JavaScript can be: <img src='xx'onerror="eval(/ale/.source+/rt/.source+/('1')/.source)">'<img /src=http://name com/x.jpgx'\noerror="eval(/ale/.source+/rt/.source+/('1')/.source)">. As will be appreciated by those of ordinary skill, the crafting of such payloads by human endeavor can be both time intensive and cost prohibitive; especially where many variations comprising different combinations and permutations of payloads need to be created to identify software vulnerabilities, such as software that causes memory safety violations (e.g., buffer overflows or buffer over-reads) and dangling pointers; uncovering input validation errors, such as format string attacks, code injection, directory traversal, Hypertext Transfer Protocol (HTTP) header injection, or HTTP response splitting; uncovering privilege-confusion issues, such as clickjacking—tricking Web users to click on something different from what the user perceives they are clicking on; uncovering privilege escalation—exploiting software design flaws or software configuration oversights in an operating system or software application to gain elevated access to resources that are normally protected from an application or a user, and the like.

On receiving the initial plurality of payloads as input 110, payload generator 102 can perform a validation scan on each of (or, in some embodiments, one or more of) the payloads comprising the initial plurality of payloads. Validation of payloads can include, but is not limited to, syntactically scanning one or more of the payloads to ensure or increase the likelihood, for example, that the received payloads conform syntactically to payloads that have been deemed to be syntactically valid in the past. In some embodiments, the syntactically scanning can be based on a language specific grammar that provides one or more rules that governs the composition of clauses, phrases, and/or words in a language. Payloads that are determined to be syntactically valid, can be included in a group of validated payloads. Payloads that are determined to not be syntactically valid can be excluded from the group of validated payloads.

Additionally, the validation scan performed by payload generator 102 can also include executing each (or, in some embodiments, one or more) of the payloads included in the received initial plurality of payloads in a browser-based component to determine whether or not the payload returns a predicted result. The determination of whether or not the payload returns a predicted result can be made based on executing the payload in the browser-based component. For instance, should a first payload, during or after execution in the browser-based component, return an invalid result (e.g., a result that is not expected), this first payload can be discarded as being a payload that will typically not uncover future software vulnerabilities. As a further example, should a second payload, during or after execution in the browser-based component, return a valid result (e.g., a result that was expected), this second payload can be included in the group of validated payloads, as this second payload can be determined to be a payload that will typically uncover future software vulnerabilities.

Once or after the payload generator 102 has validated one or more payloads and has included these payloads into the group of validated payloads, each payload (or, in some embodiments, one or more payloads) in the group of validated payloads, based on a language specific grammar that provides one or more rules governing the composition of clauses, phrases, and/or words in a language, can be atomized into atomic elements and the atomic elements can thereafter be mapped to a plurality of identifiers. For example, where a payload written in a scripting language, such as JavaScript, and included in the group of validated payloads is: <img src='xx' onerror="eval(/ale/.source+/rt/.source+/('1')/.source)">, based on one or more rules governing the composition of clauses, phrases, and/or words in the scripting language, payload generator 102 can atomize the payload into the following 16 atomic elements: "<", "img", "src", "=", """, "xx", """, "onerror", "=", """, "eval", "(", "/ale/.source+/rt/.source+/('1')/.source", ")", " " ", and ">". These atomic elements can thereafter be mapped to a plurality of identifiers. For instance, the first atomic element: "<" can be mapped to the identifier "A"; the second atomic element" "img" can be mapped to the identifier "B"; the third atomic element: "src" can be mapped to the identifier "C"; the fourth atomic element: "=" can be mapped to the identifier "D"; the fifth atomic element: """ can be mapped to the identifier "E"; the sixth atomic element: "xx" can be mapped to the identifier "F"; the seventh atomic element: """ can be mapped to the identifier "G"; the eighth atomic element: "onerror" can be mapped to the identifier "H"; the ninth atomic element: "=" can be mapped to the identifier "I"; the tenth atomic element: """ can be mapped to the identifier "J"; the eleventh atomic element: "eval" can be mapped to the identifier "K"; the twelfth atomic element: "(" can be mapped to the identifier "L"; the thirteenth atomic element: "/ale/.source+/rt/.source+/('1')/.source" can be mapped to the identifier "M"; the fourteenth atomic element: ")" can be mapped to the identifier "N"; the fifteenth atomic element: """ can be mapped to the identifier "O"; and the sixteenth atomic element: ">" can be mapped to the identifier "P". It will be noted in connection with the foregoing that the fourth and the ninth atomic elements both represent "=" and thus, in an example embodiment, the fourth and the ninth atomic elements can be represented by a single identifier, for instance, identifier "D". It should further be noted, in regard to the thirteenth atomic element: "/ale/.source+/rt/.source+/('1')/.source", represented by the identifier "M", this atomic element, should it be needed, can be further atomized based on the one or more rules governing the composition of clauses, phrases, and words in the scripting language into subatomic elements, such as: "/", "ale", "/", ".source", "+", "/", "rt", "/", ".source", "+", "/", "(", "'", "1", "'", ")", "/", and ".source", each (or, in some embodiments, one or more) of these subatomic elements can be associated with or mapped to an identifier in a manner similar to that outlined above. For instance, the first subatomic element: "I", can be mapped, for example, to the identifier "M1", similarly, the second subatomic element "ale" can be mapped, for instance, to the identifier "M2", etc. The identifiers for each payload (or, in some embodiments, one or more payloads) can be represented as a vector (or as a sequence of vectors), such as {A, B, C, D, E, F, G, H, D, J, K, L, M, N, O, P}, wherein each identifier (or, in some embodiments, one or more identifiers) included in the vector is representative of an atomic element.

Payload generator 102 having mapped the atomic elements of at least one or more of the payloads in the group of validated payloads into a vector or sequence of vectors, can then send the vector (or sequence of vectors) to a deep learning engine, such as an artificial neural network (ANN), a multilayer recurrent neural network (RNN), and the like. A deep learning engine can be a network where connections between nodes (or neurons) form a directed cycle that creates an internal state of the network that allows the deep learning engine to exhibit a dynamic temporal behavior (e.g., the network automatically and dynamically adapts over time and during each iteration). The deep learning engine, as used by payload generator 102, can be defined by a plurality of input nodes which can be activated by the identifiers supplied in the vector (or sequence of vectors), a plurality of connections between the plurality input nodes to a plurality of hidden nodes, and ultimately a plurality of connections from the plurality of hidden nodes to a plurality of terminal nodes. The connections between the plurality of input nodes to the plurality of hidden nodes and from the plurality of hidden nodes to the plurality of terminal nodes can each be associated with transitional probabilities that can represent relative probabilities associated with transitioning from a first node in the deep learning engine to a second node in the deep learning engine.

In some embodiments, the transitional probabilities associated with the connections can be determined using a normalized exponential function, such as a softmax function. Thus, when a first node in the deep learning engine is activated, a second node in the deep learning engine can be selected for activation based on transitional probabilities associated with the plurality of connections that can emanate from the activated node (e.g., the first node) to a non-empty set of possible second nodes to which the eventually selected second node is a member. The process of activating nodes based on connections to other nodes and associated transitional probabilities can be repeated until finally, terminal nodes are triggered. The triggering of the terminal nodes determines which output identifier is to be output.

For example and with reference to the example payload: <img src='xx' onerror="eval(/ale/.source+/rt/.source+/('1')/.source)">, the vector of identifiers, e.g., {A, B, C, D, E, F, G, H, D, J, K, L, M, N, O, P}, can trigger a sequence or series of nodes in the deep learning engine, such that the first node (the input node) that is activated in the deep learning engine can correspond to the identifier "A", the second and successive nodes in the deep learning engine that can be triggered or activated, in relation to this example, can relate to identifiers B, C, D, E, F, G, H, D, J, K, L, M, N, O, and P. When nodes are triggered, the deep learning engine, using a normalized exponential function, such as a softmax function, can determine transitional probability values that are associated with transitioning from a first node to a second node. For instance, the deep learning engine, based on determined transactional probabilities, can determine that if a node associated with the identifier "A" is triggered the next node to be activated should be associated with the identifier "B". Accordingly the deep learning engine, through use of the normalized exponential function, can update and/or associate a probability value (represented as a real number) to the connection that exists between the node representing the identifier "A" and the node that represents the identifier "B". This process of triggering a node associated with an identifier, determining a probability value based, for example, on a normalized exponential function, and updating and associating the determined transition probability value to the transitions between the nodes, can be repeated for each (or, in some embodiments, one or more of) of the identifiers included in the vector (or sequence of vectors). In this manner, the deep learning engine can be trained using the input vector of identifiers.

Additionally, the deep learning engine can also be used by payload generator 102 to generate or synthesize new payloads. These new payloads can be generated and synthesized if the input vector triggers various nodes in succession. For example, in regard to the example payload: <img src='xx' onerror="eval(/ale/.source+/rt/.source+/('1')/.source)">, represented by the vector of identifiers, e.g., {A, B, C, D, E, F, G, H, D, J, K, L, M, N, O, P}, the transitional probability values between the nodes in the deep learning engine can dictate different paths to which node should be transitioned to next. For instance, if the first identifier "A" triggers a first input node the transitional probability values associated with transitioning to a second hidden node can be such that rather than transitioning to a node associated with the identifier "B" the transitional probability values can indicate that the transition should be to different node, for example a node associated with an identifier W. Thus, while traversing through the deep learning engine one node at a time, the deep learning engine can synthesize payloads that can be used to identify software vulnerabilities. The output of the traversal of the nodes of the deep learning engine using the input vector: {A, B, C, D, E, F, G, H, D, J, K, L, M, N, O, P} representative of the example payload: <img src='xx' onerror="eval(/ale/.source+/('1').source+/('1')/.source)">, can, for instance, be an output vector comprising identifiers, e.g., {A, B, C, D, E, S, G, H, D, J, K, L, Y, N, O, and P}. It will be observed from the foregoing output vector that the deep learning engine has synthesized a payload, wherein the sixth and thirteenth identifiers that were in the input vector have been replaced with identifiers associated with atomic elements represented by "S" and "Y" respectively in the output vector.

Payload generator 102, on or after obtaining the output vector:{A, B, C, D, E, S, G, H, D, J, K, L, Y, N, O, and P}, and based on the language grammar, can map the respective identifiers to one or more atomic elements. For instance, the output vector:{A, B, C, D, E, S, G, H, D, J, K, L, Y, N, O, and P} can be mapped to atomic elements: "<", "img", "src", "=", """, "zz", """ "onerror" "=", """ "eval", "(", "/ale/.source+/rt/.source+/('0').source", ")", """, and ">". It will be noted that in this instance the atomic element represented by the sixth identifier "S" can be "zz" and the atomic element represented by the thirteenth identifier "Y" can be "/ale/.source+/rt/.source+/('0').source". This is indicative of the fact that transitional probability values associated with transitioning from the node representing the fifth identifier "E" to the node representative of the sixth identifier "S" had, for example, the highest transitional probability value amongst all the other transitions from the fifth node to a sixth node (e.g., a node representing the identifier "S"). Similarly, in regard to the transitional probability value associated with transitioning from the node representing the twelfth identifier "L" to the node representing the thirteenth identifier "Y" also had the highest transitional probability value amongst the various other possible transitional probability values from the node representing the twelfth identifier "L" to the node representing a thirteenth identifier "Y".

Payload generator 102, on or after receipt of the atomic elements: "<", "img", "src" "=", """, "zz", """, "onerror", "=", """, "eval", "(", "/ale/.source+/rt/.source+/('0').source", ")", """, and ">" can construct the respective atomic elements to form a synthesized payload: <img src='zz' onerror="eval(/ale/.source+/rt/.source+/('0')/.source)">. The synthesized payload, together a plurality of other disparate synthesized payloads generated in a manner similar to that described above can be merged into the initial plurality of payloads to form a merged corpus of payloads, that can be used to further train the deep learning engine as well as generate addition synthesized payloads that can be utilized to uncover software vulnerabilities.

In relation to the normalized exponential function utilized to generate transitional probabilities between the nodes or neurons in the deep learning engine, this function can be a generalization of the logistic function that transforms a K-dimensional vector z of arbitrary real values to a K-dimensional vector σ(z) of real values in the range of (0, 1) that adds up to 1. The softmax function can be a gradient-log-normalizer of a categorical probability distribution, that can be used in probabilistic multiclass classification methods such as artificial neural networks.

Figure 2:
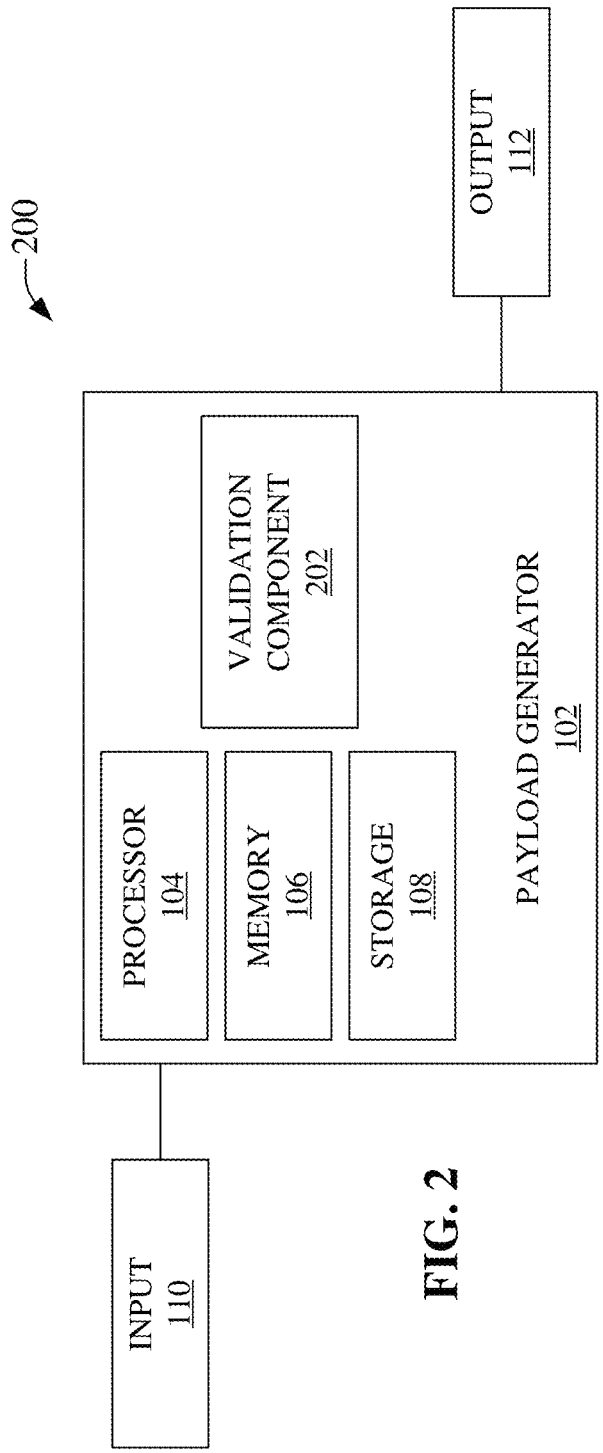
FIG. 2 illustrates another block diagram of an example, non-limiting system that synthesizing security exploits via self-amplifying deep learning in accordance with one or more embodiments described herein.

FIG. 2 illustrates another block diagram of an example, non-limiting system that facilitates synthesizing security exploits via self-amplifying deep learning in accordance with one or more embodiments described herein. Repetitive description of like elements employed in other embodiments described herein is omitted for sake of brevity.

Non-limiting system 200 can include one or more of the components and/or functionality of system 100, and vice versa. As illustrated, payload generator 102 of system 200 can include validation component 202 that receives a plurality of payloads, wherein each payload (or, in some embodiments, one or more payloads) included in the plurality of payloads can be written as one or more program instructions representative of a high-level, dynamic, untyped, interpreted programming language, such as JavaScript. An example payload that can be received by validation component 202 can comprise the following program instructions: <img src='xx'onerror="eval(/ale/.source+/rt/.source+/('1')/.source)">'<img /src=http://name.com/x.jpgx'\noerror="eval(/ale/.source+/rt/.source+/('1')/.source)">.

Validation component 202, based on a language specific grammar that provides one or more rules that governs composition of clauses, phrases, and/or words in the language, can scan each (or, in some embodiments, one or more) of the payloads included in the initial plurality of payloads to determine whether or not the payloads syntactically conform to the language specific grammar.

Additionally, validation component 202 can execute each payload (or, in some embodiments, one or more payloads) included in the initial plurality of payloads in a browser-based component to determine whether or not the payload, in response to being executed in the browser-based component, returns a predicted result. For instance, based on the validation component 202 determining that a payload, based on being executed in the browser-based component, returns an unpredicted result (e.g., a result that is unexpected or invalid), validation component 202 can ignore the payload as being one that will not uncover software vulnerabilities. Conversely, in embodiments in which the validation component 202 determines that the payload, based on being executed in the browser-based component, returns a predicted result (e.g. a result that is expected or valid), validation component 202 can include the payload in a group of validated payloads.

Figure 3:
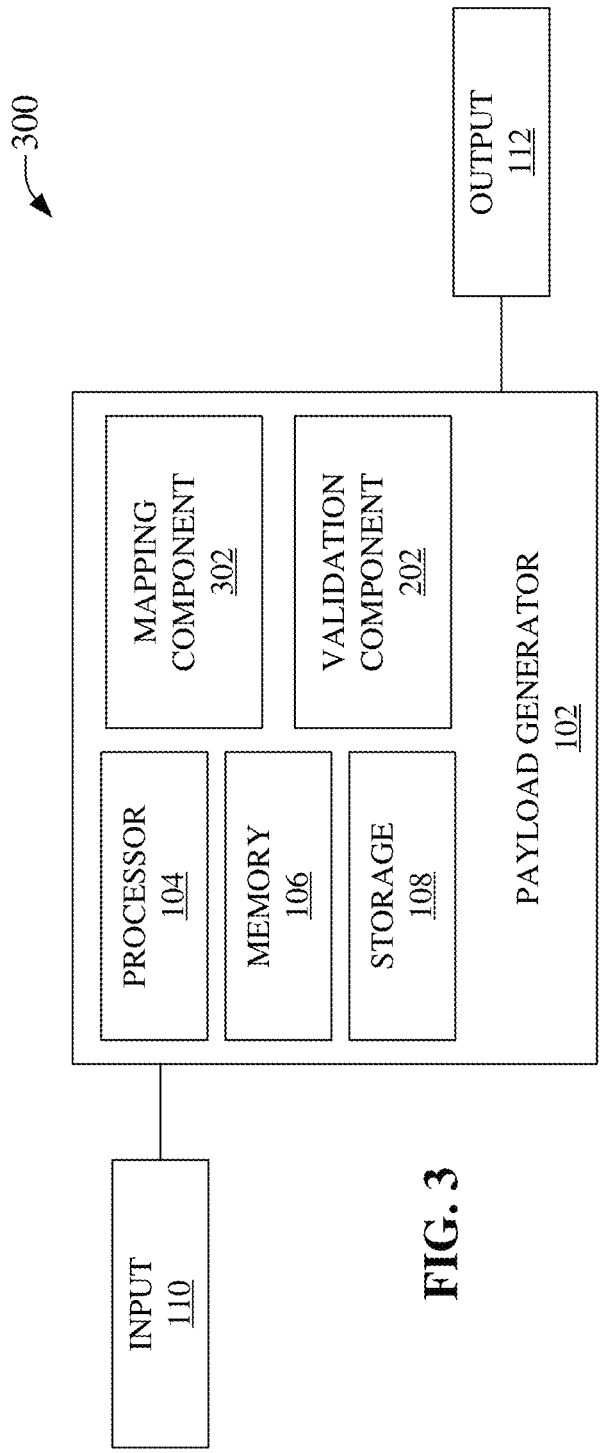
FIG. 3 illustrates another block diagram of an example, non-limiting system that facilitates synthesizing security exploits via self-amplifying deep learning in accordance with one or more embodiments described herein.

FIG. 3 illustrates another block diagram of an example, non-limiting system that facilitates synthesizing security exploits via self-amplifying deep learning in accordance with one or more embodiments described herein. Repetitive description of like elements employed in other embodiments described herein is omitted for sake of brevity.

System 300 can include one or more of the components and/or functionality of systems 100, 200 and vice versa. As shown, in some embodiments, payload generator 102 of system 300 can include mapping component 302 and validation component 202, along with one or more other components shown with reference to FIG. 1. Mapping component 302, based on a language specific grammar that provides one or more rules that govern the composition of clauses, phrases, and/or words in a language, can atomize each payload (or, in some embodiments, one or more payloads) included in the plurality of validated payloads into atomic elements and thereafter can map each respective atomic element (or, in some embodiments, one or more atomic elements) to a plurality of identifiers. For instance, where a payload written in a scripting language, such as JavaScript, and is included in the group of validated payloads is represented as: <img src='xx' onerror="eval(/ale/.source+/rt/.source+/('1')/.source)">, based on one or more rules governing composition of clauses, phrases, and words in the scripting language, mapping component 302 can atomize the payload into the following atomic elements: "<", "img", "src", "=", """, "xx", """, "onerror", "=", """, "eval", "(", "/ale/.source+/rt/.source+/('1')/.source", ")", """, and ">". These atomic elements can thereafter be mapped to a plurality of identifiers. For instance, atomic element: "<" can be mapped to identifier "A"; atomic element" "img" can be mapped to identifier "B"; atomic element: "src" can be mapped to identifier "C"; atomic element: "=" can be mapped to identifier "D"; atomic element: """ can be mapped to identifier "E"; atomic element: "xx" can be mapped to identifier "F"; atomic element: """ can be mapped to identifier "G"; atomic element: "onerror" can be mapped to identifier "H"; atomic element: "=" can be mapped to identifier "I"; atomic element: """ can be mapped to identifier "J"; atomic element: "eval" can be mapped to identifier "K"; atomic element: "(" can be mapped to identifier "L"; atomic element: "/ale/.source-+/rt/.source+/('1')/.source" can be mapped to identifier "M"; atomic element: ")" can be mapped to identifier "N"; atomic element: """ can be mapped to identifier "O"; and atomic element: ">" can be mapped to identifier "P". It will be noted in the context of atomic elements that represent "=" and these atomic elements can be represented by a single identifier, for instance, identifier "D". It should further be noted, in regard to the atomic element: "/ale/.source+/rt/.source+/('1')/.source", represented by identifier "M", this atomic element, if necessary, can be further atomized based on the one or more rules governing the composition of clauses, phrases, and words in the scripting language into subatomic elements, such as: "/", "ale", "/", ".source", "+", "/", "rt", "/", ".source", "+", "/", "(", """, "1", """, ")", "/", and ".source", each of these subatomic elements can be associated with or mapped to an identifier in a manner similar to that outlined above. For instance subatomic element: "/", can be mapped, for example, to identifier "M1", similarly, subatomic element "ale" can be mapped, for instance, to identifier "M2", etc. The identifiers for each payload can be represented as a vector (or as a sequence of vectors), such as: {A, B, C, D, E, F, G, H, D, J, K, L, M, N, O, P}, wherein each identifier included in the vector is representative of an atomic element. The vector (or sequence of vectors) can then be supplied to deep learning engine 402.

Figure 4:
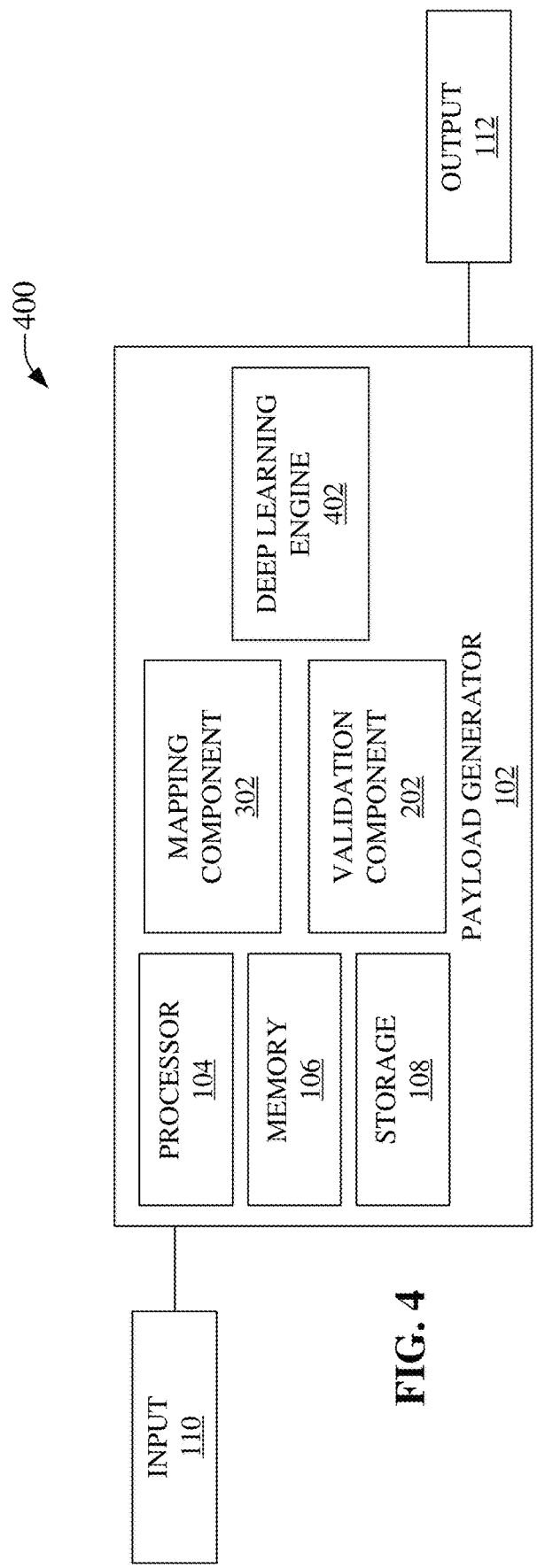
FIG. 4 illustrates another block diagram of an example, non-limiting system that facilitates synthesizing security exploits via self-amplifying deep learning in accordance with one or more embodiments described herein.

Turning now to FIG. 4, illustrated is another block diagram of an example, non-limiting system that facilitates synthesizing security exploits via self-amplifying deep learning. Repetitive description of like elements employed in other embodiments described herein is omitted for sake of brevity.

System 400 can include one or more of the components and/or functionality of systems 100, 200, 300 and vice versa. As shown, in some embodiments, payload generator 102 of system 400 can include deep learning engine 402, mapping component 302, and validation component 202, along with one or more other components shown with reference to FIG. 1.

Deep learning engine 402 can be an artificial neural network (ANN), such as a recurrent neural network (RNN). In various embodiments, deep learning engine 402 can typically be a network where connections between nodes (or neurons) form a directed cycle that creates an internal state of the network that allows deep learning engine 402 to exhibit a dynamic temporal behavior (e.g., the network automatically and dynamically adapts over time and during each iteration). Deep learning engine 402, can be defined by a plurality of input nodes which can be activated by the identifiers supplied in the vector (or sequence of vectors), a plurality of connections between the plurality input nodes to a plurality of hidden nodes, and ultimately a plurality of connections from the plurality of hidden nodes to a plurality of terminal nodes. The connections between the plurality of input nodes to the plurality of hidden nodes and from the plurality of hidden nodes to the plurality of terminal nodes can each be associated with transitional probabilities that can represent relative probabilities associated with transitioning from a first node in deep learning engine 402 to a second node in deep learning engine 402. The transitional probabilities associated with each of (or, in some embodiments, one or more of) the connections can be determined using a normalized exponential function, such as a softmax function. Thus, based on a first node in deep learning engine 402 being activated, a second node in deep learning engine 402 can be selected for activation based on transitional probabilities associated with a plurality of connections that can emanate from the activated node (e.g., the first node) to a non-empty set of possible second nodes to which the eventually selected second node is a member. The process of activating nodes based on connections to other nodes and associated transitional probabilities can be repeated until finally, terminal nodes are triggered. The triggering of the terminal nodes determines which output identifier is to be output.

For example and with reference to the example payload: <img src='xx' onerror="eval(/ale/.source+/rt/.source+/('1')/.source)">, the vector of identifiers, e.g., {A, B, C, D, E, F, G, H, D, J, K, L, M, N, O, P}, can trigger a sequence or series of nodes in deep learning engine 402, such that the first node (the input node) that is activated in deep learning engine 402 can correspond to the identifier "A", the second and successive nodes in deep learning engine 402 can be triggered or activated, in relation to this example, can relate to identifiers B, C, D, E, F, G, H, D, J, K, L, M, N, O, and P. When nodes are triggered, deep learning engine 402, using a normalized exponential function, such as a softmax function, can determine transitional probability values that are associated with transitioning from a first node to a second node. For instance, deep learning engine 402, based at least in part on determined transactional probabilities, can determine that when a node associated with identifier "A" is triggered the next node to be activated should be associated with identifier "B". Accordingly deep learning engine 402, through use of the normalized exponential function, can update and/or associate a probability value (represented as a real number) to the connection that exists between the node representing identifier "A" and the node that represents identifier "B". This process of triggering a node associated with an identifier, determining a transition probability value based, for example, on a normalized exponential function, and updating and associating the determined probability value to the transitions between the nodes, can be repeated for each of the identifiers included in the vector (or sequence of vectors). In this manner, deep learning engine 402 can be trained using the input vector of identifiers.

Additionally, deep learning engine 402 can also be employed to generate or synthesize new payloads. These new payloads can be generated and synthesized when the input vector triggers various nodes in succession. For example, in regard to the example payload: <img src='xx' onerror="eval(/ale/.source+/rt/.source+/('1')/.source)">, represented by the vector of identifiers, e.g., {A, B, C, D, E, F, G, H, D, J, K, L, M, N, O, P}, the transitional probability values between the nodes in deep learning engine 402 can dictate alternate paths to which node should be transitioned to next. For instance, when the first identifier "A" triggers a first input node the transitional probability values associated with transitioning to a second hidden node can be such that rather than transitioning to a node associated with the identifier "B" the transitional probability values can indicate that the transition should be to different node, for example a node associated with an identifier "W", for instance. Thus, while traversing through deep learning engine 402 one node at a time, deep learning engine 402 can synthesize payloads that can be used to identify software vulnerabilities. The output of the traversal of the nodes of deep learning engine 402 using the input vector: {A, B, C, D, E, F, G, H, D, J, K, L, M, N, O, P} representative of the example payload: <img src='xx' onerror="eval(/ale/.source+/rt/.source+/('1')/.source)">, can, for instance, be an output vector comprising identifiers, e.g., {A, B, C, D, E, S, G, H, D, J, K, L, Y, N, O, and P}. It will be observed from the foregoing output vector that deep learning engine 402 has synthesize a payload, wherein the sixth and thirteenth identifiers that were in the input vector have been replaced with identifiers associated with atomic elements represented by "S" and "Y" respectively in the output vector that can be directed to mapping component 302.

Returning now to FIG. 3, mapping component 302 can receive, from deep learning engine 402, the output vector: {A, B, C, D, E, S, G, H, D, J, K, L, Y, N, O, and P}, and based on the language grammar, can map the respective identifiers to one or more atomic elements. For instance, the output vector:{A, B, C, D, E, S, G, H, D, J, K, L, Y, N, O, and P} can be mapped to atomic elements: "<", "img", "src", "=", "'", "zz", "'", "onerror", "=", "'", "eval", "(", "/ale/.source+/rt/.source+/('0')/.source", ")", "'", and ">". It will be noted that in this instance the atomic element represented by the sixth identifier "S" can be "zz" and the atomic element represented by the thirteenth identifier "Y" can be "/ale/.source+/rt/.source+/('0')/.source". This is indicative of the fact that transitional probability values associated with transitioning from the node representing the fifth identifier "E" to the node representative of the sixth identifier "S" had, for instance, the highest transitional probability value among all the other possible transitions from the node representing the fifth identifier to the node representing another identifier. Similarly, in regard to the transitional probability value associated with transitioning from the node representing the twelfth identifier "L" to the node representing the thirteenth identifier "Y" also had the highest transitional probability value amongst the various other possible transitional probability values directed from the node representing the twelfth identifier "L" to the node representing a thirteenth identifier "Y".

Mapping component 302 on receipt of the atomic elements: "<", "img", "src", "=", "'", "zz", "'", "onerror", "=", "'", "eval", "(", "/ale/.source+/rt/.source+/('0')/.source", ")", "'", and ">" can construct the respective atomic elements to form a synthesized payload: <img src='zz' onerror="eval(/ale/.source+/rt/.source+/('0')/.source)">.

The synthesized payload, together a plurality of other disparate synthesized payloads generated in a manner similar to that described above can be merged into the initial plurality of payloads to form a merged corpus of payloads, that can be used to further train the ANN as well as generate addition synthesized payloads that can be utilized to uncover software vulnerabilities.

Some of the foregoing processes performed may be performed by specialized computers for carrying out defined tasks related to synthesizing security exploits via self-amplifying deep learning. The subject computer processing systems, computer-implemented methods, apparatuses and/or computer program products can be employed to solve new problems that arise through advancements in technology, computer networks, the Internet and the like. One or more embodiments of the subject computer processing systems, methods, apparatuses and/or computer program products can provide technical improvements to automated performance of synthesizing security exploits via self-amplifying deep learning by improving processing efficiency among processing components in synthesizing security exploits via self-amplifying deep learning, reducing delay in processing performed by the processing components, and/or improving the accuracy in which the processing systems perform synthesizing security exploits via self-amplifying deep learning.

Figure 5:
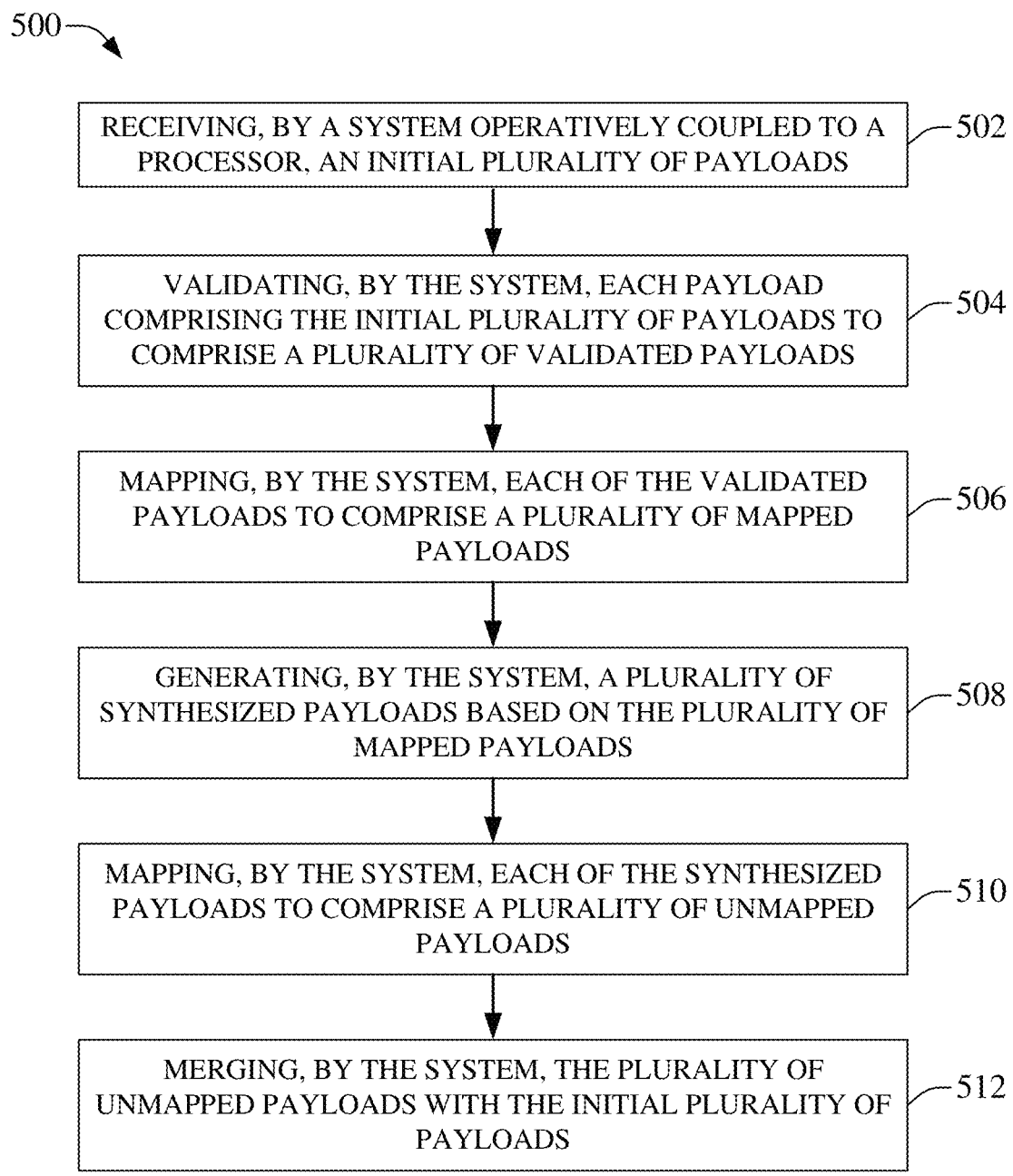
FIG. 5 illustrates a flow diagram of an example, non-limiting computer-implemented method that facilitates synthesizing security exploits via self-amplifying deep learning in accordance with one or more embodiments described herein.

FIG. 5 illustrates a flow diagram of an example, non-limiting computer-implemented method 500 that facilitates synthesizing security exploits via self-amplifying deep learning in accordance with one or more embodiments described herein. Repetitive description of like elements employed in other embodiments described herein is omitted for sake of brevity.

At 502, a system (e.g., system 400) operatively coupled to a processor (e.g., payload generator 102 of system 400) can receive an initial plurality of payloads. For example, an initial plurality of payloads can be received, for instance by payload generator 102, as a data structure, such as a file, and can comprise payloads comprising program instructions written in a high-level, dynamic, un-typed, and/or interpreted programming language, such as JavaScript. An example payload that can be received by payload generator 102 can be: <img src='xx' onerror="eval(/ale/.source+/rt/.source+/('1')/.source)">'<img /src=http://name.com/x.jpgx' \noerror="eval(/ale/.source+/rt/.source+/('1')/.source)">.

At 504, the system 400 can validate each payload (or, in some embodiments, one or more payloads) comprising the initial plurality of payloads to comprise a plurality of validated payloads. For example, each payload comprising the initial plurality of payloads can be validated by payload generator 102. In some embodiments, the validation component 202 can scan each payload included in the initial plurality of payloads to ensure (or, in some embodiments, meet a defined likelihood or increase probability) that the payload is syntactically valid in relation to payloads that have been deemed to be syntactically valid in the past and/or in the context of a language specific grammar that provides one or more rules governing the composition of clauses, phrases, and/or words in a language.

At 504, validation component 202 of system 400 can also execute each (or, in some embodiments, one or more) of the payloads included in the initial plurality of payloads in a browser-based component to determine whether or not the included payloads, in response to being executed in the browser-based component, returns a predicted result. For instance, in response to validation component 202 executing a first payload in the browser-based component, and the browser-based component returning an unexpected result, validation component 202 can discard this first payload as being a payload that will generally not uncover software vulnerabilities. In a further example, in response to validation component 202 executing a second payload in the browser-based component, and the browser-based component returning an expected result, validation component 202 can include this second payload in a grouping of validated payloads, as this second payload can have been determined as being a payload that can possibly uncover software vulnerabilities. Further at 504, payloads that have been determined by validation component 202 as being syntactically valid and/or determined, using the browser-based component, as being capable of uncovering software vulnerabilities, can be included in a group of validated payloads. Payloads that have been determined by validation component 202 as being syntactically invalid and/or have been determined to be unable to uncover software vulnerabilities can be omitted from the plurality of validated payloads.

At 506, the system 400 can map each (or, in some embodiments, one or more) of the validated payloads to generate a plurality of mapped payloads. For instance, each payload in the plurality of payloads and based on the language specific grammar can be atomized into its constituent atomic elements by payload generator 102. In accordance with an example, if a payload written in a scripting language is represented as: <img src='xx' onerror="eval(/ale/.source+/rt/.source+/('1')/.source)">, the payload can be atomized by payload generator 102, based on the language specific grammar, into the following atomic elements: "<", "img", "src", "=", "'", "xx", "'", "onerror", "=", "'", "eval", "(", "/ale/.source+/rt/.source+/('1')/.source", ")", "'", and ">". These atomic elements can then be mapped, by mapping component 302, to a plurality of identifiers. For example, mapping component 302 can map atomic element: "<" to identifier "A"; atomic element: "img" to identifier "B"; atomic element: "src" to identifier "C"; atomic element: "=" to identifier "D"; atomic element: "'" to identifier "E"; atomic element: "xx" to identifier "F"; atomic element: "'" to identifier "G"; atomic element: "onerror" to identifier "H"; atomic element: "=" to identifier "I"; atomic element: "'" to identifier "J"; atomic element: "eval" to identifier "K"; atomic element: "(" to identifier "L"; atomic element: "/ale/.source+/rt/.source+/('1')/.source" to identifier "M"; atomic element: ")" to identifier "N"; atomic element: "'" to identifier "O"; and atomic element: ">" to identifier "P". Further, since the fourth and the ninth atomic elements both represent the atomic element: "=", the mapping component 302 can map the fourth and the ninth atomic elements, for example, to identifier "D". The mapping, by mapping component 302, of the atomic elements to identifiers can result in the vector {A, B, C, D, E, F, G, H, D, J, K, L, M, N, O, P}, representative of the atomized payload: <img src='xx' onerror="eval(/ale/.source+/rt/.source+/('1')/.source)">.

The vector {A, B, C, D, E, F, G, H, D, J, K, L, M, N, O, P} can then be directed as input to an artificial neural network (ANN), such as, but not limited to, a recurrent neural network (RNN).

In various embodiments, the ANN can be a plurality of nodes (e.g., pluralities of input nodes, pluralities of hidden nodes, and pluralities of output nodes) connected by a plurality of connections to form a directed cycle, wherein each (or, in some embodiments, one or more) of the connections between the plurality of nodes are associated with transitional probability values that are used to direct the sequence of activation of the respective plurality of nodes. The ANN on receiving, for instance, the vector {A, B, C, D, E, F, G, H, D, J, K, L, M, N, O, P}, representing the example payload: <img src='xx' onerror="eval(/ale/.source+/rt/.source+/('1')/.source)"> can generate one or more output vectors comprising identifiers that can be representative one or more synthesized payloads. For example, based on the foregoing example vector {A, B, C, D, E, F, G, H, D, J, K, L, M, N, O, P}, the ANN can produce the output vector {A, B, C, D, E, S, G, H, D, J, K, L, Y, N, O, P}. The output vector {A, B, C, D, E, S, G, H, D, J, K, L, Y, N, O, P} can represent synthesized payload: <img src='zz' onerror="eval(/ale/.source+/rt/.source+/('0')/.source)">.

At 508, the system 400 can generate a plurality of synthesized payloads based on the mapped payloads. For example, deep learning engine 402 of system 400, based on the vector {A, B, C, D, E, F, G, H, D, J, K, L, M, N, O, P}, representing the example payload: <img src='xx' onerror="eval(/ale/.source+/rt/.source+/('1')/.source)">that has previously been atomized into atomic elements, can generate one or more output vectors comprising identifiers that can be representative of one or more synthesized payloads. For example, deep learning engine 402 based on the foregoing example input vector {A, B, C, D, E, F, G, H, D, J, K, L, M, N, O, P} can produce the output vector {A, B, C, D, E, S, G, H, D, J, K, L, Y, N, O, P}. This output vector {A, B, C, D, E, S, G, H, D, J, K, L, Y, N, O, P} can represent synthesized payload: <img src='zz' onerror="eval (/ale/.source+/rt/.source+/('0')/.source)">, albeit in atomized form comprising atomic elements.

At 510, the system 400 can un-map each of the synthesized payloads to generate a plurality of unmapped payloads. For instance, and in accordance with the foregoing example output vector {A, B, C, D, E, S, G, H, D, J, K, L, Y, N, O, P}, mapping component 302 can receive the output vector that is representative of a synthesized payload, map, based on the language grammar, the identifiers that comprise the output vector to one or more atomic elements: "<", "img", "src", "=", """, "zz", """, "onerror", "=", """, "eval", "(", "/ale/.source+/rt/.source+/('0')/.source", ")", """, and ">", and thereafter constitute the one or more respective atomic elements to form the synthesized payload: <img src='zz' onerror="eval(/ale/.source+/rt/.source+ /('0')/.source)">. The result of the foregoing can produce an unmapped payload that represents the synthesized payload: <img src='zz' onerror="eval(/ale/.source+/rt/.source+ /('0')/.source)">.

At 512, the system 400 can merge the plurality of unmapped payloads with the initial plurality of payloads. For example, payload generator 102 of system 400, once mapping component 302 has completed mapping, based on the language grammar, the identifiers to corresponding atomic elements, and thereafter constituting the atomic elements into a synthesized payload, payload generator 102 can concatenate the synthesized payload to the initial plurality of payloads.

Figure 6:
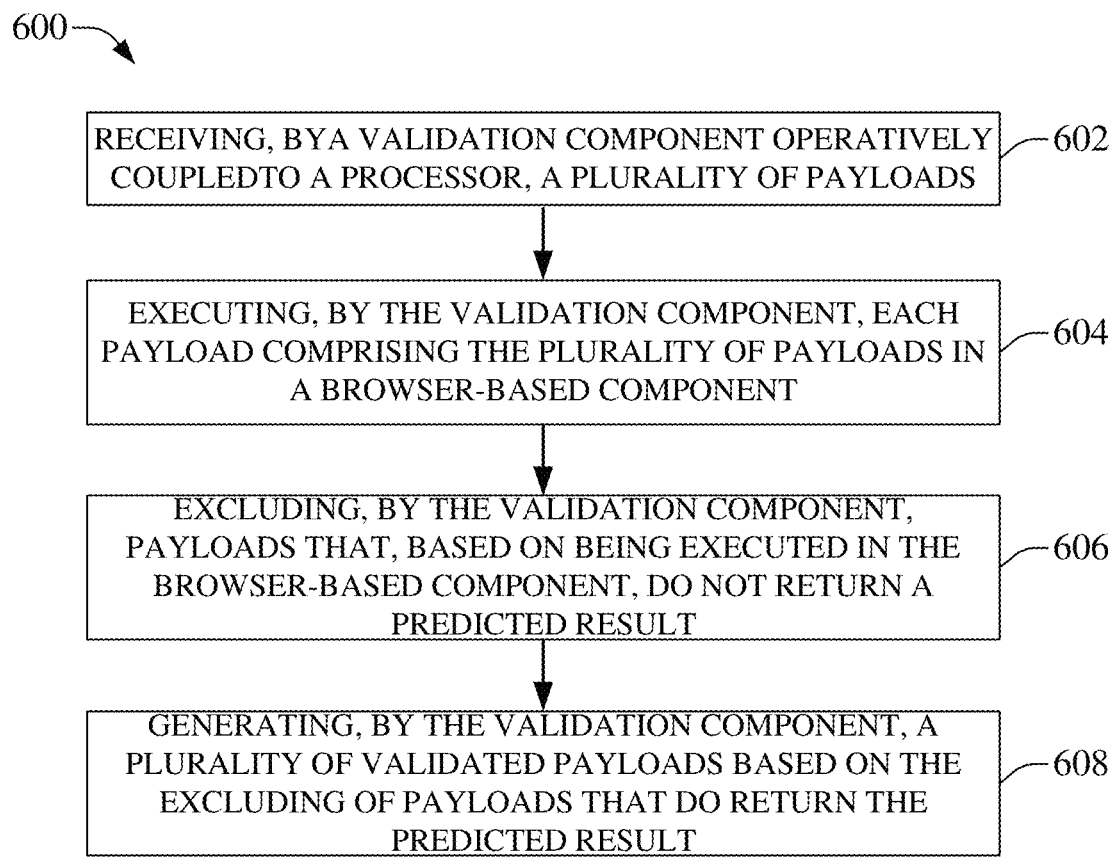
FIG. 6 illustrates a flow diagram of an example, non-limiting computer-implemented method that facilitates synthesizing security exploits via self-amplifying deep learning in accordance with one or more embodiments described herein.

FIG. 6 illustrates a flow diagram of another example, non-limiting computer-implemented method 600 that facilitates synthesizing security exploits via self-amplifying deep learning in accordance with one or more embodiments described herein. Repetitive description of like elements employed in other embodiments described herein is omitted for sake of brevity.

At 602, a plurality of payloads can be received. For instance, validation component 202 can receive a plurality of payloads, wherein each payload can have been written as program instructions that represent a high-level, dynamic, un-typed, and interpreted programming language, such as JavaScript. An example payload that can be received by validation component 202 can comprise the following program instructions: <img src='xx' onerror="eval (/ale/.source+/rt/.source+/('1')/.source)">'<img /src=http:// name.com/x.jpgx' \noerror="eval(/ale/.source+/rt/.source+ /('1')/.source)">. Validation component 202, based at least in part on a language specific grammar that provides one or more rules that govern the composition of clauses, phrases, and words in the language, can scan each of the payloads (or in some embodiments, one or more of the payloads) included in the initial plurality of payloads to determine whether or not the payloads (or, in some embodiments, one or more of the payloads) syntactically conform to the language specific grammar.

At 604, the validation component 202 can execute each payload comprising the plurality of payloads in a browser-based component. In some embodiments, the validation component 202 can execute one or more of the payload comprising the plurality of payloads in the browser-based component. For example, the validation component 202, through functionalities provided by validation component 202, can execute each payload (or, in some embodiments, one or more payloads) included in the initial plurality of payloads in a browser-based component to determine whether or not the payload, when executed in the browser-based component, returns a predicted result.

At 606, the validation component 202 can exclude payloads that, based on being executed in the browser-based component, do not return a predicted result. For example, validation component 202 can determine, in response to executing the payload in the browser-based component, that an unpredicted result (e.g., a result that is unexpected) is returned. Based on the unpredicted result, validation component 202 can ignore the payload as being one that will not uncover software vulnerabilities.

At 608, the validation component 202 can generate a plurality of (or, in some embodiments, one or more) validated payloads based on the exclusion of payloads that do not return predicted result. For instance, validation component 202 can determine, in response to executing the payload in the browser-based component, that a predicted result (e.g., a result that is expected) is returned. Based on the return of the predicted result, validation component 202 can include the payload in a group of validated payloads.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 7:
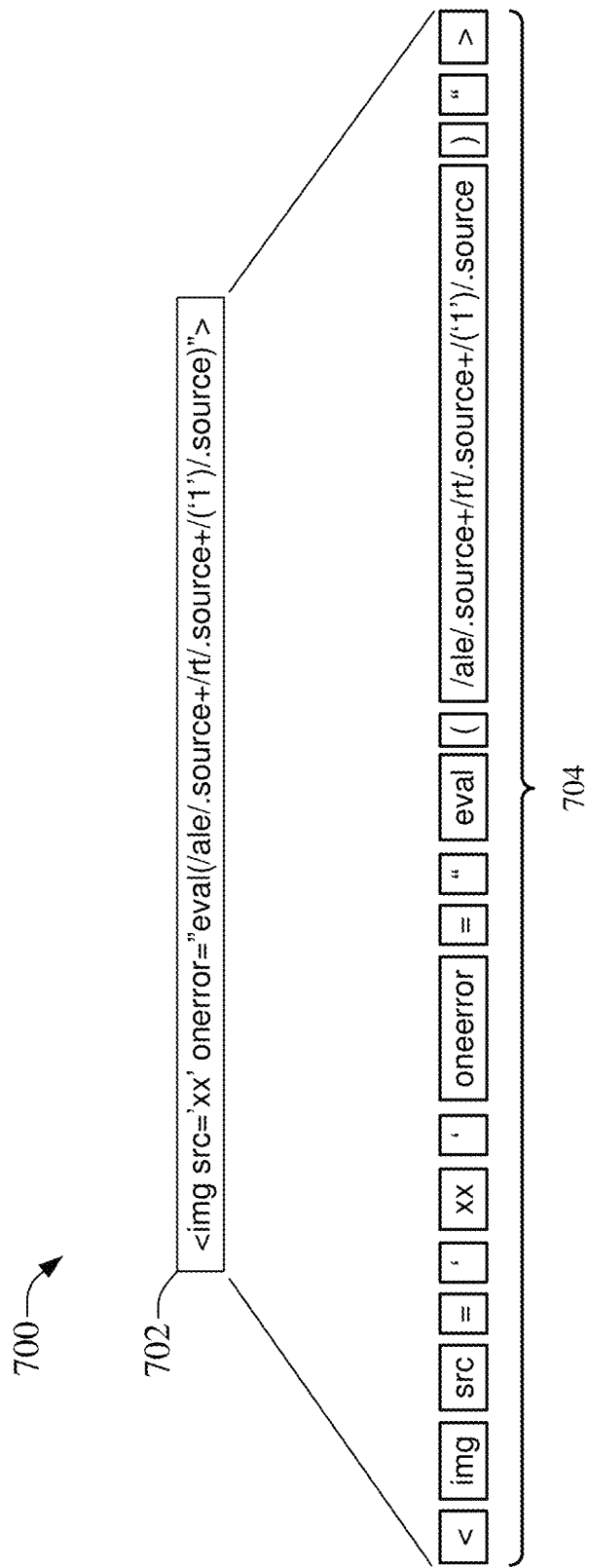
FIG. 7 illustrates an example, non-limiting encoding of a payload and an example, non-limiting atomization of the payload that facilitates synthesizing security exploits via self-amplifying deep learning in accordance with one or more embodiments described herein.

FIG. 7 illustrates an example encoding of a payload and an example atomization of a payload that facilitates synthesizing security exploits via self-amplifying deep learning in accordance with one or more embodiments described herein. As depicted, an example payload 702: <img src='xx' onerror="eval(/ale/.source+/rt/.source+/('1')/.source)">, written in a scripting language, such as JavaScript, can be supplied to mapping component 302. Mapping component 302, based on a language grammar, can atomize the payload into atomic elements 704. In this instance, atomic elements 704 can comprise: "<", "img", "src", "=", """, "xx", """, "onerror", "=", """, "eval", "(", "/ale/.source+/rt/.source+ /('1')/.source", ")", """, and ">".

Figure 8:
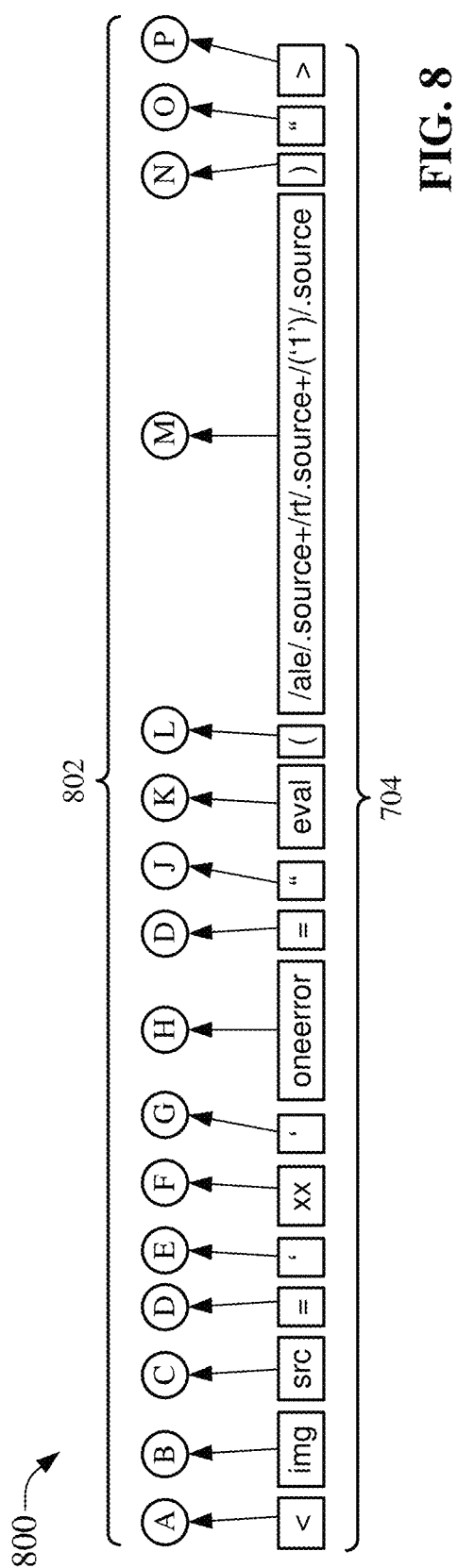
FIG. 8 illustrates an example, non-limiting mapping of an atomized payload that facilitates synthesizing security exploits via self-amplifying deep learning in accordance with one or more embodiments described herein.

FIG. 8 illustrates an example mapping of an atomized payload that facilitates synthesizing security exploits via self-amplifying deep learning in accordance with one or more embodiments described herein. As illustrated, atomic elements 704 can be mapped to a plurality of (or, in some embodiments, one or more) identifiers. For instance, in the example shown, atomic element: "<" can be mapped to identifier "A"; atomic element: "img" can be mapped to identifier "B"; atomic element: "src" can be mapped to identifier "C"; atomic element: "=" can be mapped to identifier "D"; atomic element: """ can be mapped to identifier "E"; atomic element: "xx" can be mapped to identifier "F"; atomic element: """ can be mapped to identifier "G"; atomic element: "onerror" can be mapped to identifier "H"; atomic element: "=" can be mapped to identifier "I"; atomic element: """ can be mapped to identifier "J"; atomic element: "eval" can be mapped to identifier "K"; atomic element: "(" can be mapped to identifier "L"; atomic element: "/ale/.source+/rt/.source+/('1')/.source" can be mapped to identifier "M"; atomic element: ")" can be mapped to identifier "N"; atomic element: """ can be mapped to identifier "O"; and atomic element: ">" can be mapped to identifier "P". It will be noted in regard to the atomic elements that represent "=", these atomic elements can be represented by a single identifier, for instance, identifier "D". It should further be noted, in regard to the atomic element: "/ale/.source+/rt/.source+/('1')/.source", represented by identifier "M", this atomic element, though not depicted, can be further atomized based on the one or more rules governing the composition of clauses, phrases, and/or words in the scripting language into subatomic elements, such as: "/", "ale", "/", ".source", "+", "/", "rt", "/", ".source", "+", "/", "(", """, "1", """. ")", "/", and ".source". In some embodiments, each of (or, in some embodiments, one or more of) these subatomic elements can be associated with or mapped to an identifier in a manner similar to that outlined above. For instance the first subatomic element: "/", can be mapped, for example, to identifier "M1", similarly, the second subatomic element "ale" can be mapped, for instance, to identifier "M2",etc. The identifiers for each payload can be represented as a vector (or as a sequence of vectors), such as {A, B, C, D, E, F, G, H, D, J, K, L, M, N, O, P}, wherein each identifier included in the vector is representative of an atomic element.

Figure 9:
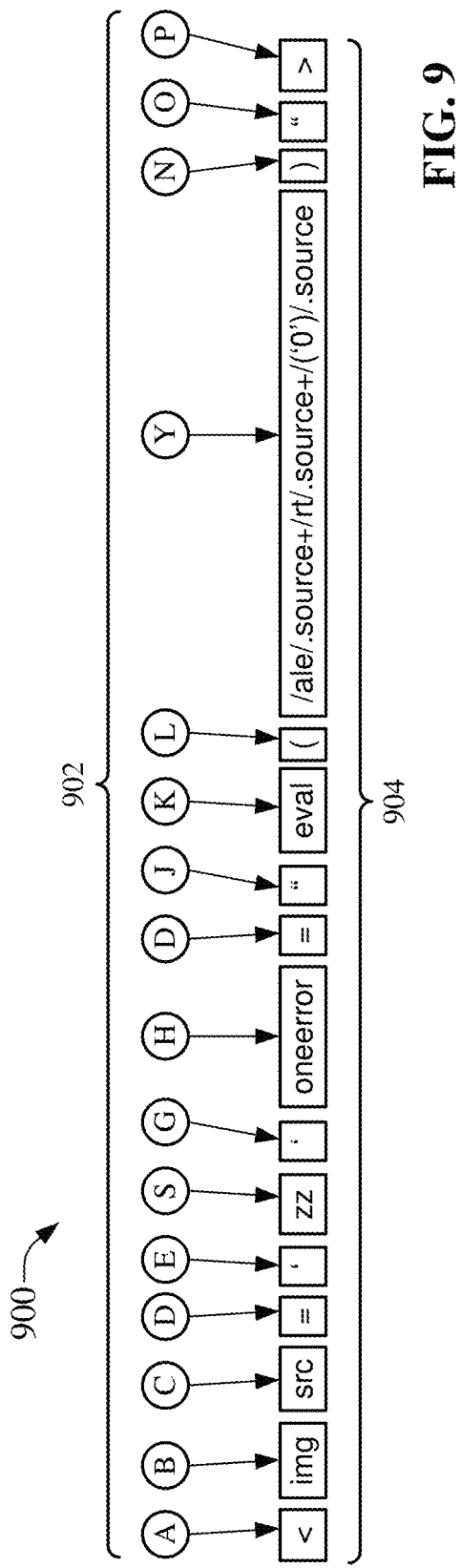
FIG. 9 illustrates an example, non-limiting mapping of a generated and atomized payload that facilitates synthesizing security exploits via self-amplifying deep learning in accordance with one or more embodiments described herein.

FIG. 9 illustrates an example mapping of a generated and atomized payload that facilitates synthesizing security exploits via self-amplifying deep learning in accordance with one or more embodiments described herein. Illustrated is an example mapping of identifiers 902 to atomized elements 904. In this instance, the identifiers 902 have been output by deep learning engine 402 as a vector of identifiers, such as {A, B, C, D, E, S, G, H, D, J, K, L, Y, N, O, and P}. The vector of identifiers can be received by mapping component 302, whereupon mapping component 302, based in a language grammar, can map the respective identifiers to atomic elements 904. For instance, the output vector {A, B, C, D, E, S, G, H, D, J, K, L, Y, N, O, and P} can be mapped to atomic elements 904 comprising: "<", "img" "src" "=" """ "zz" """ "onerror" "=" """ "eval" "(", "/ale/.source+/rt/.source+/('0')/.source", ")", """, and ">".

Figure 10:
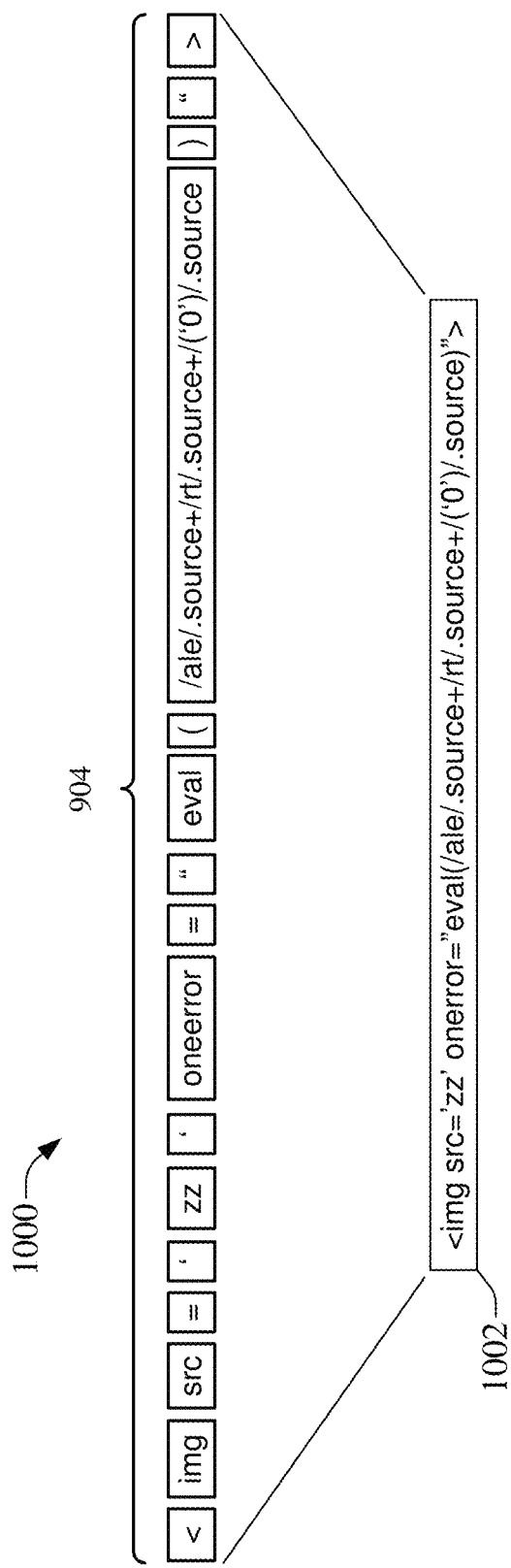
FIG. 10 illustrates an example, non-limiting decoding of a generated and atomized payload and an example of the generated payload that facilitates synthesizing security exploits via self-amplifying deep learning in accordance with one or more embodiments described herein.

FIG. 10 illustrates an example decoding of a generated and atomized payload and an example of the generated payload that facilitates synthesizing security exploits via self-amplifying deep learning. Mapping component 302 can then use atomic elements 904 comprising: "<", "img", "src", "=", """, "zz", """, "onerror", "=", """, "eval", "(", "/ale/.source+/rt/.source+/('0')/.source", ")", """, and ">" to construct the respective atomic elements to form a synthesized payload 1002: <img src='zz' onerror="eval (/ale/.source+/rt/.source+/('0')/.source)">.

Figure 11:
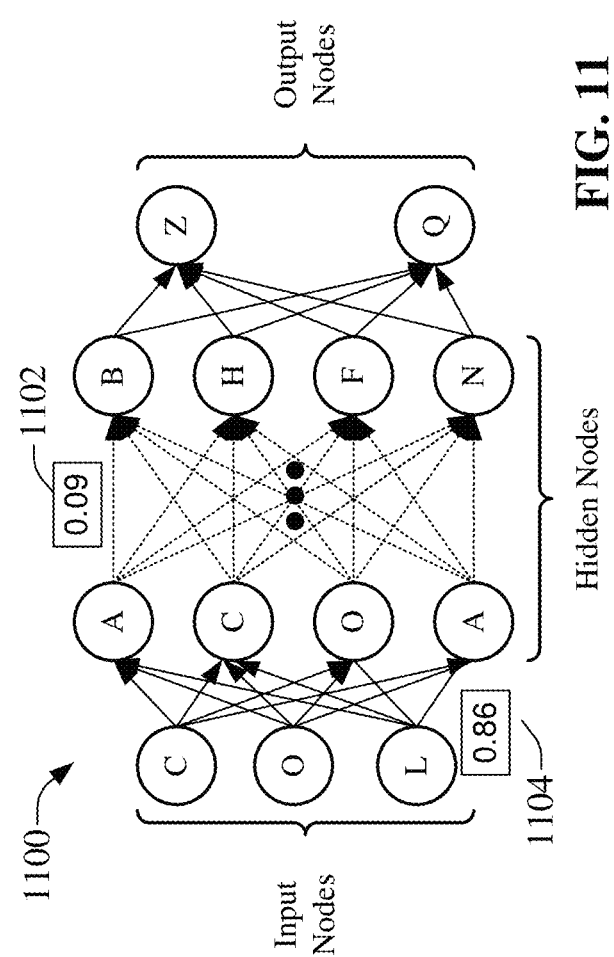
FIG. 11 illustrates an example, non-limiting artificial neural network that facilitates synthesizing security exploits via self-amplifying deep learning in accordance with one or more embodiments described herein.

FIG. 11 illustrates an example artificial neural network 1100 that facilitates synthesizing security exploits via self-amplifying deep learning. As illustrated, the artificial neural network 1100 can comprise a set of input nodes, in this instance labeled "C", "O", and "L". Each of the input nodes "C", "O", and "L" can be respectively connected to each of a first set of hidden nodes "A", "C", "O", and "A", and each of the first set of hidden nodes can be respectively connected to each of a further set of hidden nodes "B", "H", "F", and "N". The further set of hidden nodes can thereafter be connected to a set of output nodes "Z" and Q. As will be appreciated by those of ordinary skill in the art, artificial neural network 1100 can comprise an innumerable numerous number of input nodes, hidden nodes, and output nodes. Further, as will also be appreciated by those of ordinary skill, each (or, in some embodiments, one or more) of the connections between the input nodes, hidden nodes, and the output nodes can be associated with transition probability values, which can provide guidance as to which second node should be transitioned to from a first node. For instance, in relation to input node "L", the transition probability value associated with transitioning to the hidden node "A" has been determined to be 0.86. Similarly, in the context of transitioning from first hidden node "A" to second hidden node "B" the transition probably value associated with this transition has been determined to be 0.09.

Figure 12:
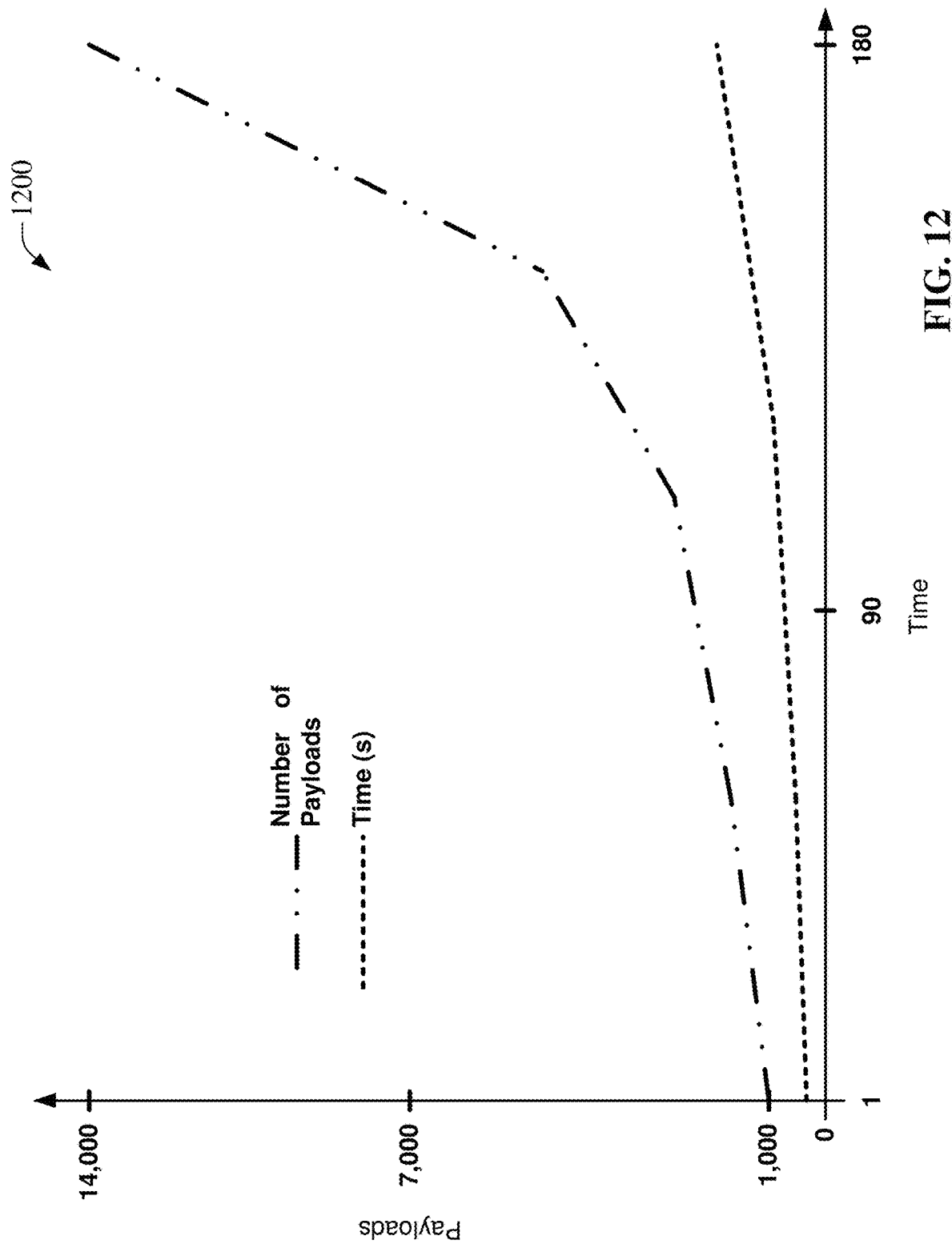
FIG. 12 illustrates an example, non-limiting trend visualization for the per-round number of payloads and time for synthesizing security exploits via self-amplifying deep learning in accordance with one or more embodiments described herein.

FIG. 12 illustrates an example trend visualization 1200 for the per-round number of payloads and time for synthesizing security exploits via self-amplifying deep learning in one or more embodiments described herein. Example trend visualization 1200 depicts in graph form a relationship between the number of payloads synthesized and a number of iterations performed by an artificial neural network. As depicted, when the artificial neural network is supplied with an initial body of 1000 payloads, after approximately 2000 seconds and 180 iterations of the artificial neural network, approximately 13,000 payloads can have been synthesized from the initial 1000 payloads.

Figure 13:
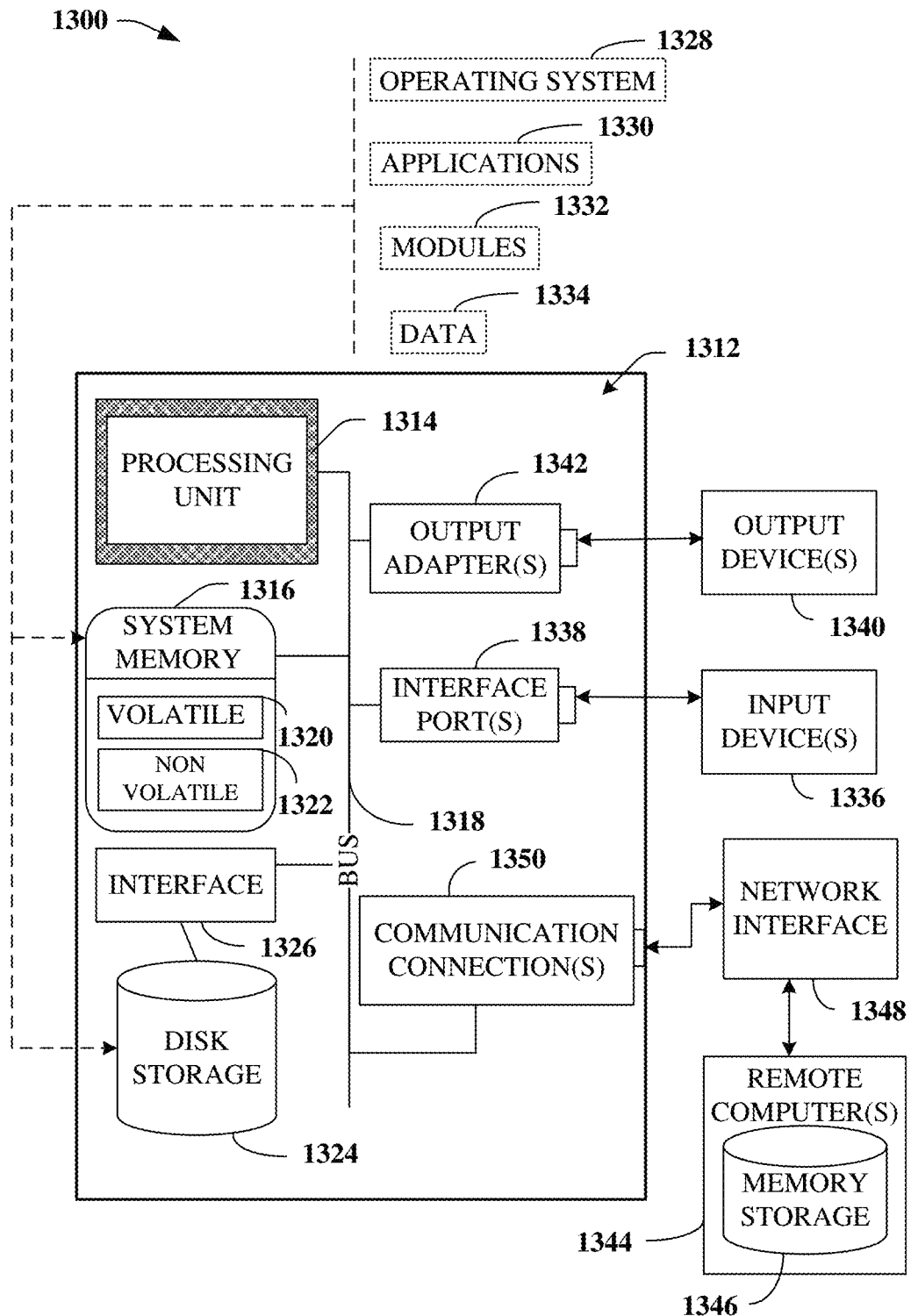
FIG. 13 illustrates a block diagram of an example, non-limiting operating environment in which one or more embodiments described herein can be facilitated.

In order to provide a context for the various aspects of the disclosed subject matter, FIG. 13 as well as the following discussion, are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity.

With reference to FIG. 13, a suitable operating environment 1301 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/nonvolatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1301. Such software can also include, for example, an operating system 1328. Operating system 1328, which can be stored on disk storage 1324, acts to control and allocate resources of the computer 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and number-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transition word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   atomizing, by a system operatively coupled to a processor, a payload of a first group of payloads into a plurality of atomic elements based on a programming language specific grammar of a programming language of the payload;
   mapping, by the system, atomic elements of the plurality of atomic elements to unique identifiers, where same atomic elements of the plurality of atomic elements have same unique identifiers of the unique identifiers;
   generating, by the system, a second group of payloads based upon a deep learning engine and the unique identifiers mapped to the atomic elements;
   executing, by the system, respective payloads of the second group of payloads using a software program to determine whether one or more software vulnerabilities of the software program is exposed by the respective payloads; and outputting, by the system, validation results indicative of whether the one or more software vulnerabilities of the software program are exposed by the respective payloads.

2. The computer-implemented method of claim 1, further comprising:
outputting, by the system, the second group of payloads.

3. The computer-implemented method of claim 1, wherein the generating the second group of payloads comprises:
generating an input vector that represents the payload based on the unique identifiers.

4. The computer-implemented method of claim 3, wherein the generating the second group of payloads further comprises:
applying the input vector to the deep learning engine of the system.

5. The computer-implemented method of claim 4, wherein the generating the second group of payloads further comprises:
generating a sequence of probability vectors in response to applying the input vector to a multilayer recurrent network of the deep learning engine, wherein the multilayer recurrent network comprises a probabilistic model generated based on an evaluation of one or more payloads included in a first group of payloads.

6. The computer-implemented method of claim 5, wherein the generating the second group of payloads further comprises:
generating the second group of payloads based on the sequence of probability vectors.

7. The computer-implemented method of claim 1, further comprising
merging the second group of payloads with the first group of payloads.

8. A computer program product for synthesizing security exploits via self-amplifying deep learning, the computer program product comprising a computer readable storage medium having program instructions embodied therewith, the program instructions executable by a processing component to cause the processing component to:
atomize a payload of a first group of payloads into a plurality of atomic elements based on a programming language specific grammar of a programming language of the payload;
map atomic elements of the plurality of atomic elements to unique identifiers, where same atomic elements of the plurality of atomic elements have same unique identifiers of the unique identifiers;
generate a second group of payloads based upon a deep learning engine and the unique identifiers mapped to the atomic elements;
execute respective payloads of the second group of payloads using a browser-based component to determine whether one or more software vulnerabilities of the browser-based component is exposed by the respective payloads; and
output validation results indicative of whether the one or more software vulnerabilities of the software program are exposed by the respective payloads.

9. The computer program product of claim 8, wherein the program instructions are further executable by the processing component to cause the processing component to output the second group of payloads.

10. The computer program product of claim 8, wherein the program instructions are further executable by the processing component to cause the processing component to generate an input vector that represents the payload based on the unique identifiers.

11. The computer program product of claim 10, wherein the program instructions are further executable by the processing component to cause the processing component to apply the input vector to the deep learning engine of the system.

12. The computer program product of claim 11, wherein the program instructions are further executable by the processing component to cause the processing component to generate a sequence of probability vectors in response to applying the input vector to a multilayer recurrent network of the deep learning engine, wherein the multilayer recurrent network comprises a probabilistic model generated based on an evaluation of one or more payloads included in a first group of payloads.

13. The computer program product of claim 12, wherein the program instructions are further executable by the processing component to cause the processing component to generate the second group of payloads based on the sequence of probability vectors.

14. The computer program product of claim 11, wherein the program instructions are further executable by the processing component to cause the processing component to merging the second group of payloads with the first group of payloads.

15. A device, comprising:
a processor; and
a memory communicatively coupled to the processor, the memory having stored therein computer-executable components, comprising:
a payload generator component that:
atomizes a payload of a first group of payloads into a plurality of atomic elements based on a programming language specific grammar of a programming language of the payload;
maps atomic elements of the plurality of atomic elements to unique identifiers, where same atomic elements of the plurality of atomic elements have same unique identifiers of the unique identifiers;
generates a second group of payloads based upon a deep learning engine and the unique identifiers mapped to the atomic elements; and
executes respective payloads of the second group of payloads using a software application to determine whether one or more software vulnerabilities of the software application is exposed by the respective payloads; and
outputs validation results indicative of whether the one or more software vulnerabilities of the software program are exposed by the respective payloads.

16. The system of claim 15, wherein the payload generator component outputs the second group of payloads.

17. The system of claim 15, wherein the payload generator component generates an input vector that represents the payload based on the unique identifiers.

18. The system of claim 17, wherein the payload generator component applies the input vector to the deep learning engine of the system.

19. The system of claim 18, wherein the payload generator component generates a sequence of probability vectors in response to applying the input vector to a multilayer recurrent network of the deep learning engine, wherein the multilayer recurrent network comprises a probabilistic model generated based on an evaluation of one or more payloads included in a first group of payloads.

20. The system of claim 19, wherein the payload generator component generates the second group of payloads based on the sequence of probability vectors.

* * * * *